United States Patent [19]

Furlough

[11] Patent Number: 5,024,281
[45] Date of Patent: Jun. 18, 1991

[54] REVERSIBLE MOLDBOARD PLOW

[75] Inventor: Thomas D. Furlough, Tarboro, N.C.

[73] Assignee: Long Manufacturing N.C., Inc., Tarboro, N.C.

[21] Appl. No.: 562,026

[22] Filed: Aug. 2, 1990

[51] Int. Cl.⁵ .............................................. A01B 3/40
[52] U.S. Cl. .................................... 172/219; 172/439; 172/459; 172/666; 172/772
[58] Field of Search ............... 172/204, 210, 213, 215, 172/219, 223, 224, 225, 439, 443, 448, 459, 460, 666, 772

[56] References Cited

U.S. PATENT DOCUMENTS

| | | |
|---|---|---|
| 1,149,720 | 8/1915 | Brown . |
| 2,597,079 | 5/1952 | Dukes . |
| 2,672,801 | 3/1954 | Barrett . |
| 2,724,313 | 11/1955 | Jennings . |
| 2,752,836 | 7/1956 | Pilch . |
| 2,764,075 | 9/1956 | Fowler ............................ 172/211 |
| 3,042,120 | 7/1962 | Heckathorn et al. . |
| 3,101,788 | 8/1963 | Jennings ............................ 172/219 |
| 3,101,789 | 8/1963 | Jennings . |
| 3,115,191 | 12/1963 | Ward ............................ 172/219 X |
| 3,126,969 | 3/1964 | Sewell ............................ 172/719 |
| 3,305,025 | 2/1967 | Johnson et al. . |
| 3,995,698 | 12/1976 | Nelson et al. ............................ 172/719 |
| 4,603,745 | 8/1986 | Watvedt ............................ 172/225 X |
| 4,646,849 | 3/1987 | Watvedt ............................ 172/225 |
| 4,800,963 | 1/1989 | Gomez ............................ 172/219 |
| 4,869,327 | 9/1989 | Korf ............................ 172/211 |
| 4,942,928 | 7/1990 | Gomez ............................ 172/219 |

FOREIGN PATENT DOCUMENTS

| | | | |
|---|---|---|---|
| 970204 | 7/1975 | Canada ............................ | 172/219 |
| 2390079 | 1/1979 | France ............................ | 172/219 |
| 640688 | 1/1979 | U.S.S.R. . | |
| 812199 | 3/1981 | U.S.S.R. . | |
| 1603204 | 3/1977 | United Kingdom . | |
| 1497259 | 1/1978 | United Kingdom ............................ | 172/219 |
| 2002211 | 2/1982 | United Kingdom ............................ | 172/219 |

OTHER PUBLICATIONS

"Reversible Plow", Photographs, Mfg. by Harrell Equip. Co., Inc., Vada, Georgia, sold prior to Oct. 1989.

Primary Examiner—David H. Corbin
Assistant Examiner—Jeffrey L. Thompson
Attorney, Agent, or Firm—Dowell & Dowell

[57] ABSTRACT

A reversible moldboard plow has a plow carrying beam swingably mounted at the rear crossbar of a frame which carries trunnion mounted cylinders connected to the beam for moving the beam, the front of the frame carrying hitch pins for connection to a tractor hitch, the hitch pins being vertically movable in alternate relation in order to tilt the frame and the beam with the moldboards supported thereon. The hitch pins may be moved by independent cylinders and pistons or, alternately, by the movement of a transverse hitch bar on which they are mounted.

12 Claims, 6 Drawing Sheets

REVERSIBLE MOLDBOARD PLOW

FIELD OF THE INVENTION

This invention relates to plows for tilling the earth and more particularly to a moldboard type plow which is reversible for an improved result.

BACKGROUND OF THE INVENTION

Reversible moldboard and disc type plows have been used for some time. They require an implement support which is shiftable to change the angle at which the implement is pulled through the earth as it proceeds back and forth so that the angle for one direction is the same as that for the following opposite direction.

A reversible plow throws the dirt in the same direction when travelling in opposite directions in a longitudinal path. The need for such a plow arises from the necessity to create equal furrows without leaving free spaces and to provide an even, levelled surface.

HISTORY OF THE PRIOR ART

In the past, reversible disks or an extra set of moldboards have been used so that right and left side plowing can be done, but at the cost of additional weight, equipment and power.

Reversible plows with disks fixed to a tool bar or with only one set of moldboards have also been used as in the U.S. Pat. Nos. to Gomez 4,800,963, Fowler 2,764,075, and Johnson et al. 3,305,025. Other patents of related nature are Brown 1,149,720, Dukes 2,597,079, Barrett 2,672,801, Jennings 2,724,313, Heckathorn et al. 3,042,120, Jennings 3,101,789, Watvedt 4,646,849, Korf 4,869,327, British patent 1,497,259 of Jan. 5, 1978, and U.S.S.R. patents 640,688 of January 1979 and 812,199 of March 1981.

The U.S. Pat. Nos. to Watvedt 4,603,745 and 4,825,955 disclose double plowshares mounted on a plow frame which is rotatable in a vertical plane about a shaft by the action of a pair of hydraulic cylinders and pistons.

French patent 2,390,079 of January 1979, especially FIG. 1, and Johnson et al. 3,305,025, mentioned above, especially FIG. 3, disclose hitch bars that are pivotally mounted in order to move in a vertical plane between plow angular positions.

The U.S. Pat. No. to Katayama et al. 4,553,605 discloses link arms that are movable up and down by lift rods operated by hydraulic cylinders for the purpose of tilting the implement.

SUMMARY OF THE INVENTION

It is an object of the invention to provide a moldboard type plow in which the moldboards may be shifted to plow from either side, the shifting being done by power means controlled as required by the tractor hydraulics and able to stand up to the demanding type of plowing done by moldboards.

A further object is to provide a power operated means for tilting the frame carrying the moldboards in order to adjust the depth of cut of the bottom of the furrow.

A further object is to provide a hydraulic hookup for the moldboard shifting cylinders and the frame tilting cylinder(s) in which the cylinders are operated sequentially, instead of simultaneously, thus reducing the hydraulic pressure required for the operation, and in which all cylinders are locked following actuation in order to hold the moldboards in the adjusted plowing position.

The foregoing objects are accomplished by the use of a central moldboard carrying beam that is pivotally mounted in a frame having hitch connections, the beam being connected to trunnion mounted cylinder and piston assemblies that control the travel angle of the moldboards and the attitude or angle of the hitch connections being vertically shiftable by auxiliary cylinder and piston assemblies in order to adjust the tilt of the moldboards.

BRIEF DESCRIPTION OF THE DRAWINGS

FIG. 6 is a section to an enlarged scale on the line 6—6 of FIG. 4;

FIG. 7 is a section to an enlarged scale on the line 7—7 of FIG. 6;

DESCRIPTION OF THE PREFERRED EMBODIMENT

Figure 1:
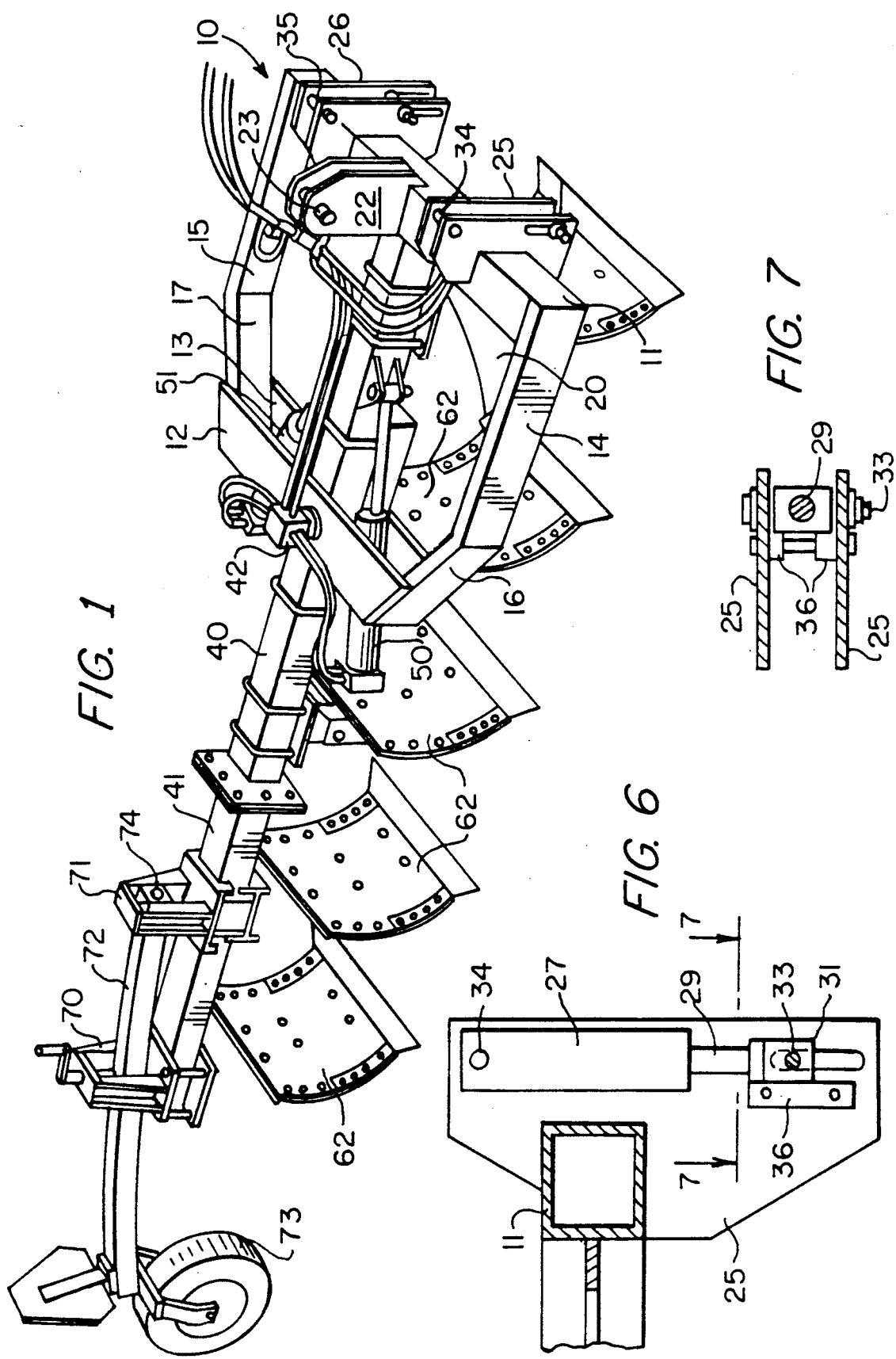
FIG. 1 is a perspective from the right side of a preferred embodiment of the invention.
Figure 2:
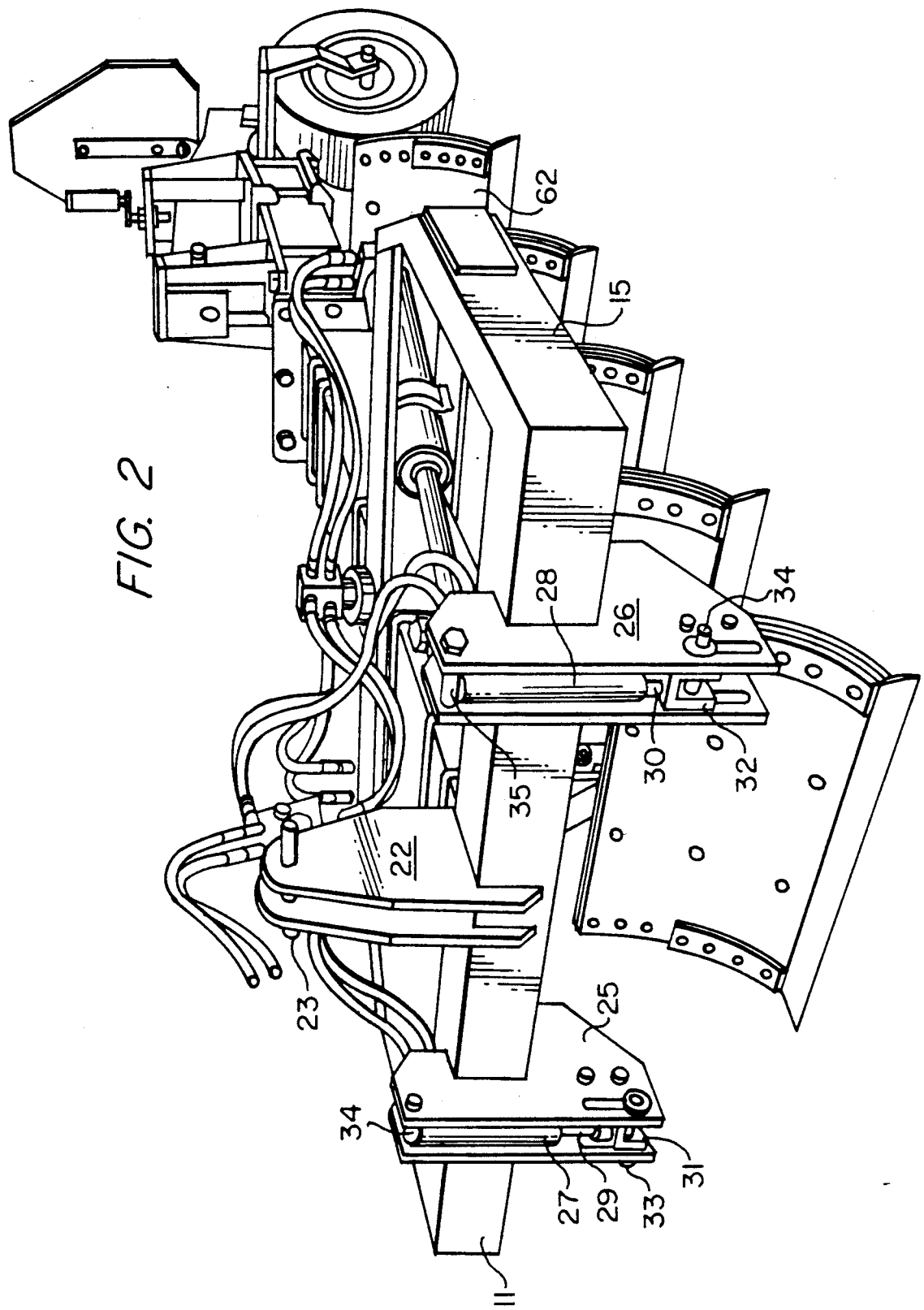
FIG. 2 is a perspective to an enlarged scale from the left side of the same embodiment.
Figure 3:
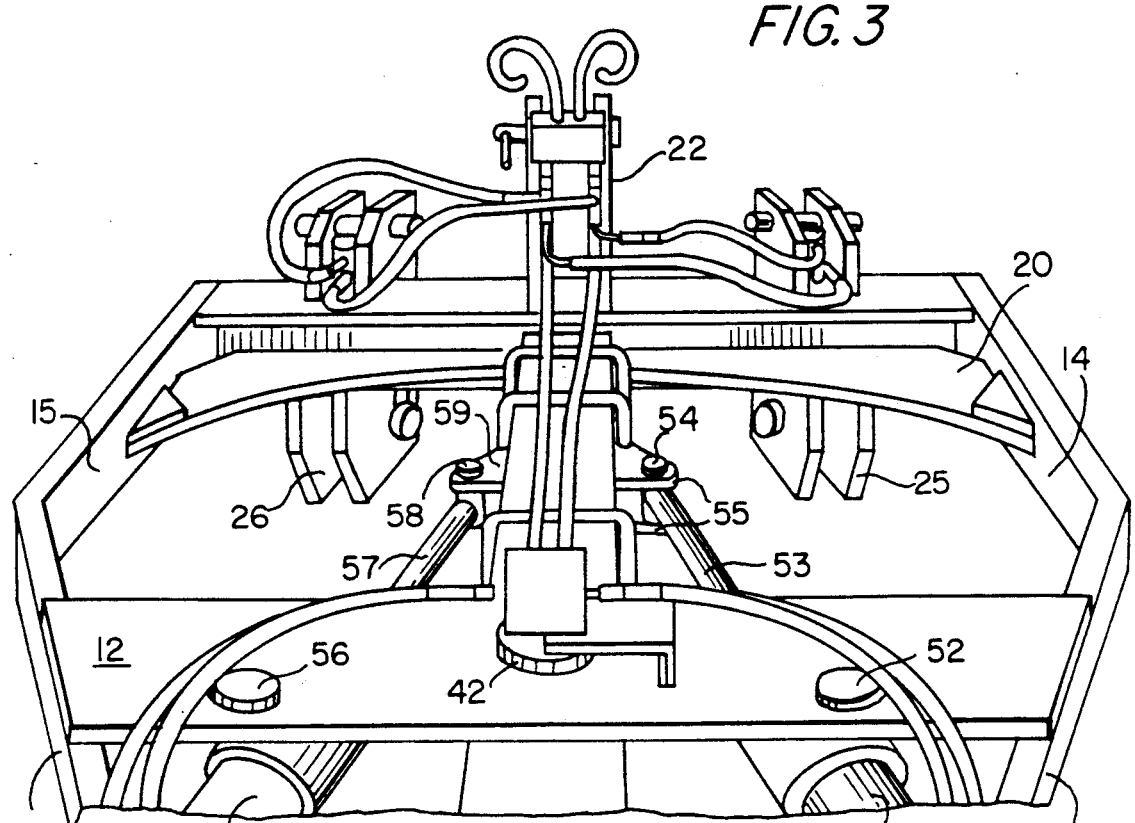
FIG. 3 is a fragmentary perspective from the rear of the forward portion of the apparatus.

With further reference to the drawings, there is illustrated a frame 10 having a front cross member 11, a rear cross member comprising upper and lower plates 12 and 13, right and left side members 14 and 15 extending perpendicularly rearwardly from the front cross member 11, and inclined side members 16 and 17 extending to the ends of the rear cross member 12 and 13.

At the rear of the front cross member 11 an arcuate plate 20 bridges the sides 14 and 15 for purposes which will be described. Extending upwardly from the central and forward portion of the front cross member is an upper hitch plate 22, in two parallel sections, and having a hitch pin 23 extending therethrough for the purposes of attaching to the hitch point of the tractor's three point hitch.

Spaced at either side of the upper hitch plate 22 are right and left lower hitch plates 25 and 26 each of which comprises a pair of spaced plate side members that are connected to the front cross member 11. Between the side members of each lower hitch plate is a cylinder and piston assembly including cylinders 27 and 28, pistons 29 and 30, which are connected to clevises 31 and 32 carrying hitch pins 33 and 34 projecting from the sides of the outer hitch plates where the hitch pin may be received by the lower connections of the three point hitch on the tractor. The cylinders 27 and 28 are mounted by pins 34 and 35 across the tops of the spaced hitch plates in order to permit any necessary swinging movement of the cylinder and piston assemblies.

In order to reduce the wear on the hitch plates, a replaceable and reversible metal wear plate 36 is mounted at the rear of each of the clevises 31 and 32. This protects the slot in which the pin 33 reciprocates from excessive wear.

The frame mounts a longitudinal beam which may be in two sections 40 and 41. The forward section 40 is received intermediate the upper and lower rear cross members 12 and 13 and connected thereto by a pivot 42 which permits the beam to swing laterally of the frame. The forward end of the frame has a ledge plate with upper and lower sections 45, 45 and wear strips 46, 47 which ride on the top and bottom of the arcuate plate 20 previously described, in order to support the forward end of the longitudinal beam.

In order to control the position of the longitudinal beam within the frame 10 a pair of cylinders 50 and 51 are mounted, one on each side of the beam. Thus a right cylinder 50 is mounted with its cylinder intermediate the upper and lower portions of the rear cross member 12 and 13 by a pivot or trunnion mounting 52, its piston 53 extending to a pin 54 mounted between a pair of lugs 55 which are in spaced relation from the forward end of the beam.

Similarly the cylinder 51 has a trunnion mounting 56 and a piston 57 which is connected to a pin 58 between lugs 59 on the opposite side of the beam.

It will be apparent therefore that by the simultaneous operation of the piston assemblies that the forward portion of the longitudinal beam may be angularly shifted from side to side within the frame 10.

The front and rear portions of the longitudinal beam 40-41 have a series of spaced brackets 60 which are connected to mounting plates 61 for holding a series of spaced moldboards 62.

For purposes of convenience and flexibility, as previously indicated, the longitudinal beam may be divided into two portions 40 and 41. The rear portion 41 of the beam has supports 70 and 71 for a rear wheel beam 72 for carrying a gauge wheel 73. Suitable adjusting means 74 are carried in the support 71 in order that the height of the gauge wheel may be adjusted.

Figure 12:
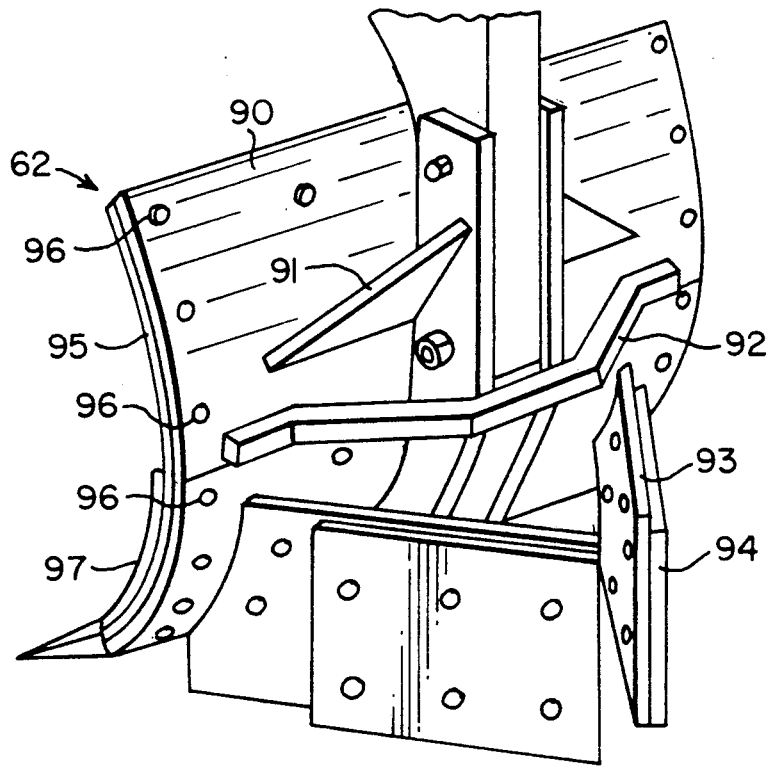
FIG. 12 is a perspective to an enlarged scale of a moldboard.

With reference to FIG. 12, the moldboards 62 may be made of curved metal frame sections 90 having upper bracket means 91, central bracket means 92 and lower bracket means 93 with protective follower members 94 that aid in the control of the tractor. The frame sections 90 are faced with a wear sheet 95 secured by fasteners 96 and holder strip 97 for reducing the wear on the moldboards and the need for frequent replacement.

Figure 13:
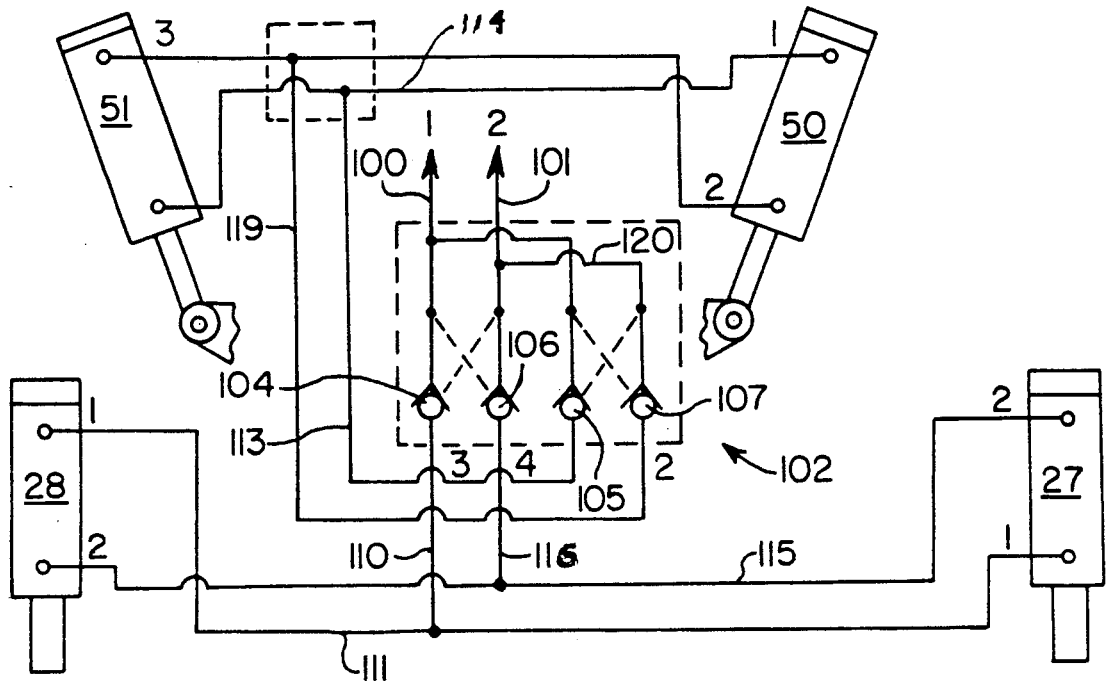
FIG. 13 is a schematic of the hydraulic connections to the positioning and tilt cylinders.

The hydraulic control circuit for the positioning cylinders and tilt cylinders is illustrated in FIG. 13. In this figure lines 100-101 may connect to the hydraulic control lines of the tractor. These are connected to a double dual lock out box 102.

In box 102 line 100 is connected to joints 104 and 105; line 101 is connected to joints 106 and 107.

Joints 104 is connected to lines 110 and 111 to one side of tilt cylinders 27 and 28. Joint 105 is connected to lines 113 and 114 to one side of positioning cylinders 50 and 51.

The return side of tilt cylinders 27 and 28 are connected by lines 115 and 116 to joint 106 and line 101 back to the tractor.

Similarly, the return lines 118 and 119 from the positioning cylinders 50 and 51 are connected to the joint 107 and line 120 to the line 101 to the tractor.

In the operation of the tractor hydraulics, the opening of the circuit will generally unlock the circuit with the less pressure, which is usually the positioning cylinder circuit, permitting movement of these cylinders until the plow beam goes the maximum extent and hits the stop, either on the right or the left side. At this point the pressure build up and causes the tilt cylinders to operate. After all of the hydraulic functions have been completed additional pressure will bleed over to the tractor relief. When the tractor lever is returned to neutral, the double dual lockout will lock all of the cylinders, preventing them from any movements during the plowing operation.

Figure 4:
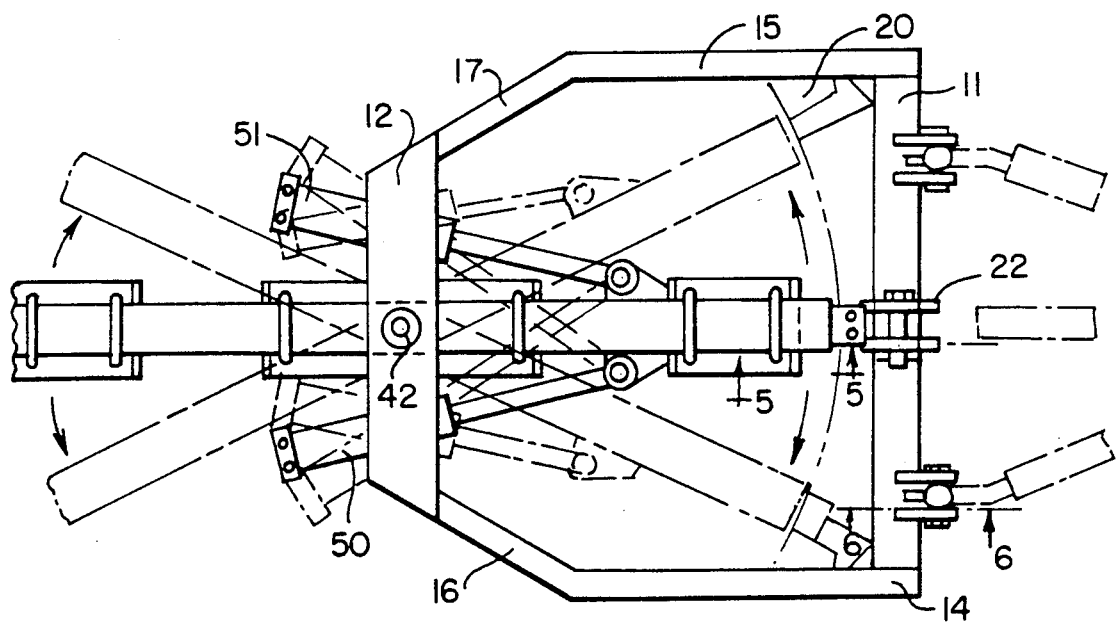
FIG. 4 is a plan view indicating the pivotal movement of the beam which carries the moldboards.
Figure 5:
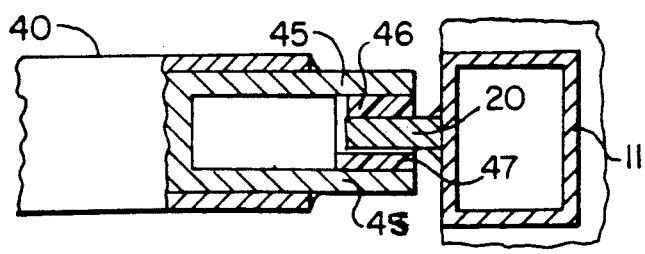
FIG. 5 is a section to an enlarged scale on the line 5—5 of FIG. 4.
Figure 8:
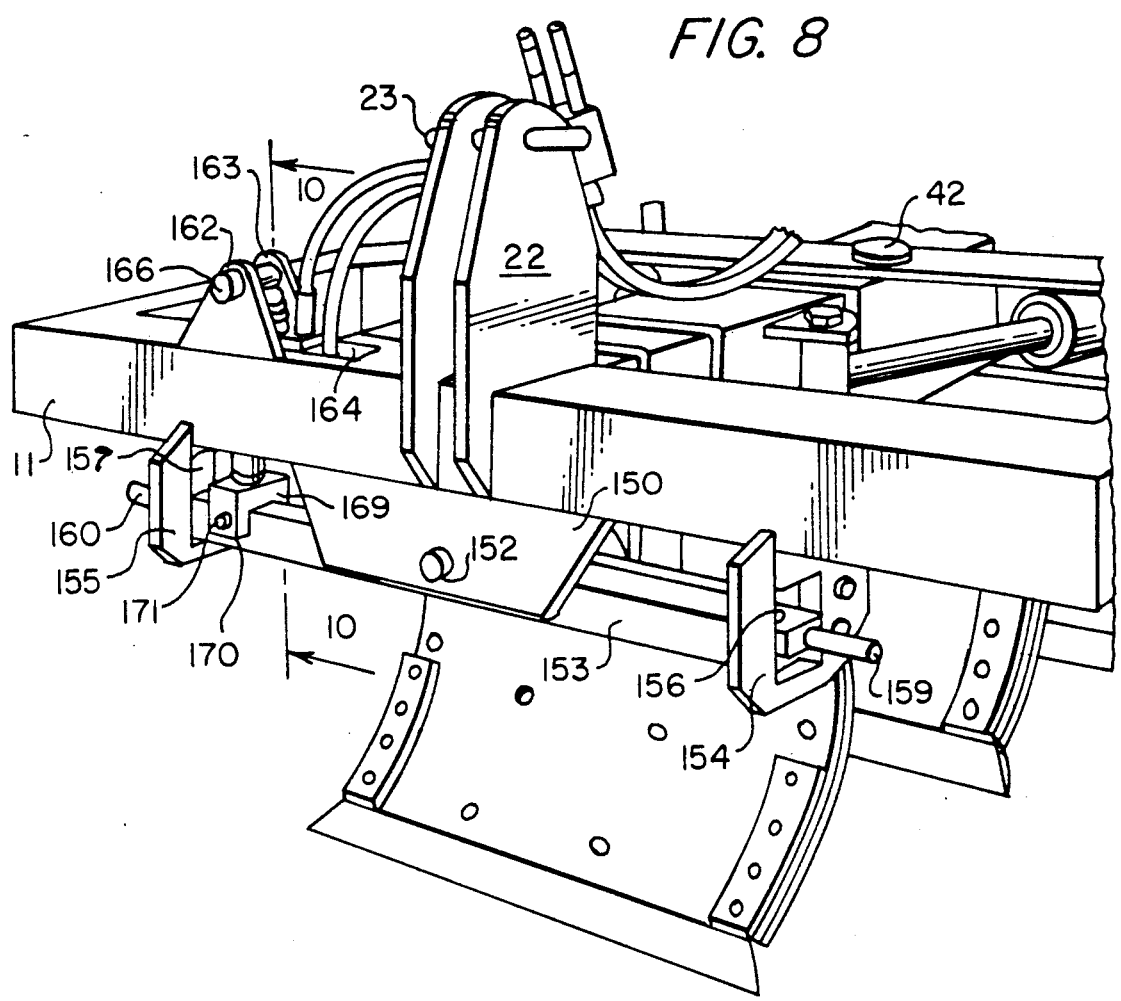
FIG. 8 is an enlarged perspective from the left side of a modification of the invention.
Figure 10:
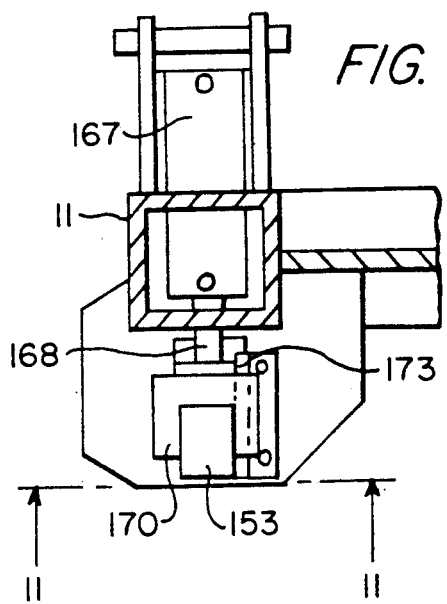
FIG. 10 is a section to an enlarged scale on the line 10—10 of FIG. 8.
Figure 11:
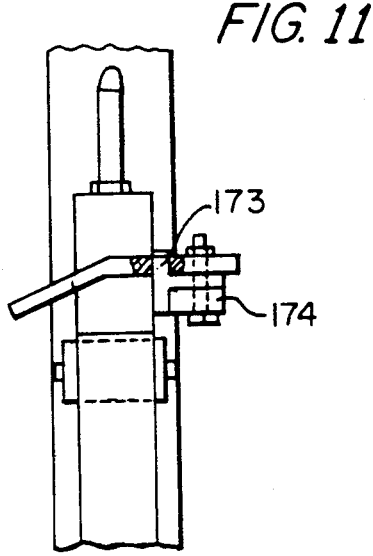
FIG. 11 is a section on the line 11—11 of FIG. 10.
Figure 9:
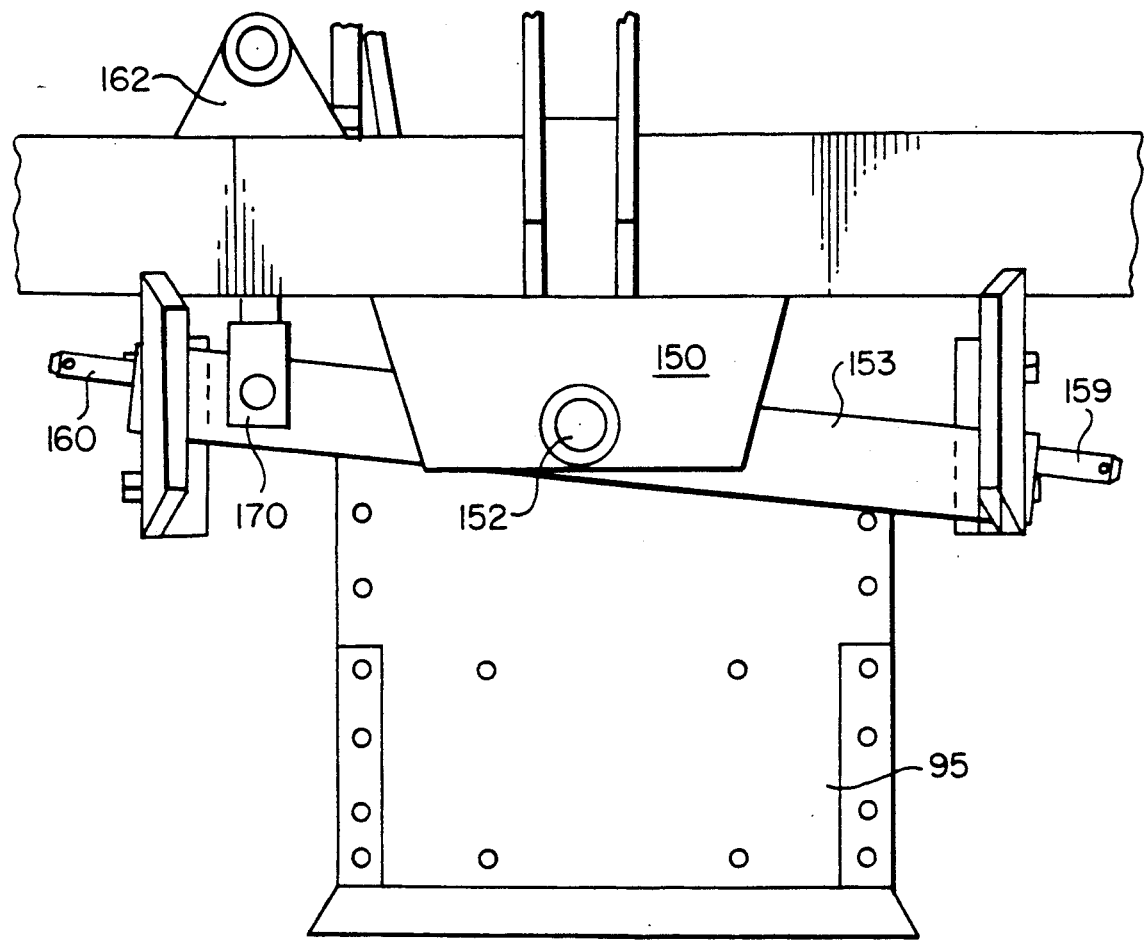
FIG. 9 is a front elevation to an enlarged scale illustrating the hitch plate assembly.

It will be understood that at the end of each row, the tractor three-way hitch is generally operated to raise the frame and the beam with the moldboards attached clear of the field until the tractor has turned 180° and is in position to resume plowing in the opposite direction. Then the three-way hitch is lowered in order that plowing in the opposite direction may be done. During the time that the three way hitch is raised the hydraulic circuit may be operated in order to properly position the beam with the moldboards in the proper position for plowing (See FIG. 4) and also to properly position the frame in its appropriately tilted position.

FIGS. 8-11 illustrate a modification of the invention. The modification is in the mounting by means of which the height of the left and right hitch pins are controlled. Instead of having a separate cylinder and piston assembly for each of the hitch pins, the modification includes a hitch plate pivot assembly, as particularly illustrated in FIGS. 8 and 9. The assembly includes a hitch plate 150 that is mounted on and depends downwardly from the front cross member 11, substantially centrally thereof. The hitch plate has a center pivot 152 which supports a hitch bar 153 that is pivotally mounted between left and right lower hitch plates 154 and 155. The hitch plates have openings 156 and 157, respectively, for receiving the ends of the hitch bar as it oscillates, the hitch bar carrying left and right lift pins 159 and 160.

A pair of spaced lugs 162-163 are mounted over an opening 164 on the right side of the front cross member 11 and substantially over the right lower hitch plate 155. The lug 162 carries a pivot pin 166 which mounts a cylinder 167 which operates a piston 168 connected to a web 169 of a clevis 170 which engages the hitch bar 153 by means of a pin 171.

Accordingly, by operation of the cylinder and piston assembly the hitch bar may be caused to pivot about the pivot support 152 in order to raise and lower the right and left lift pins 160 and 159. A replacement tee-shaped wear plate 173 is held by a clamp 174 connected to the hitch plate 155 and engaging the clevis 170.

Figure 14:
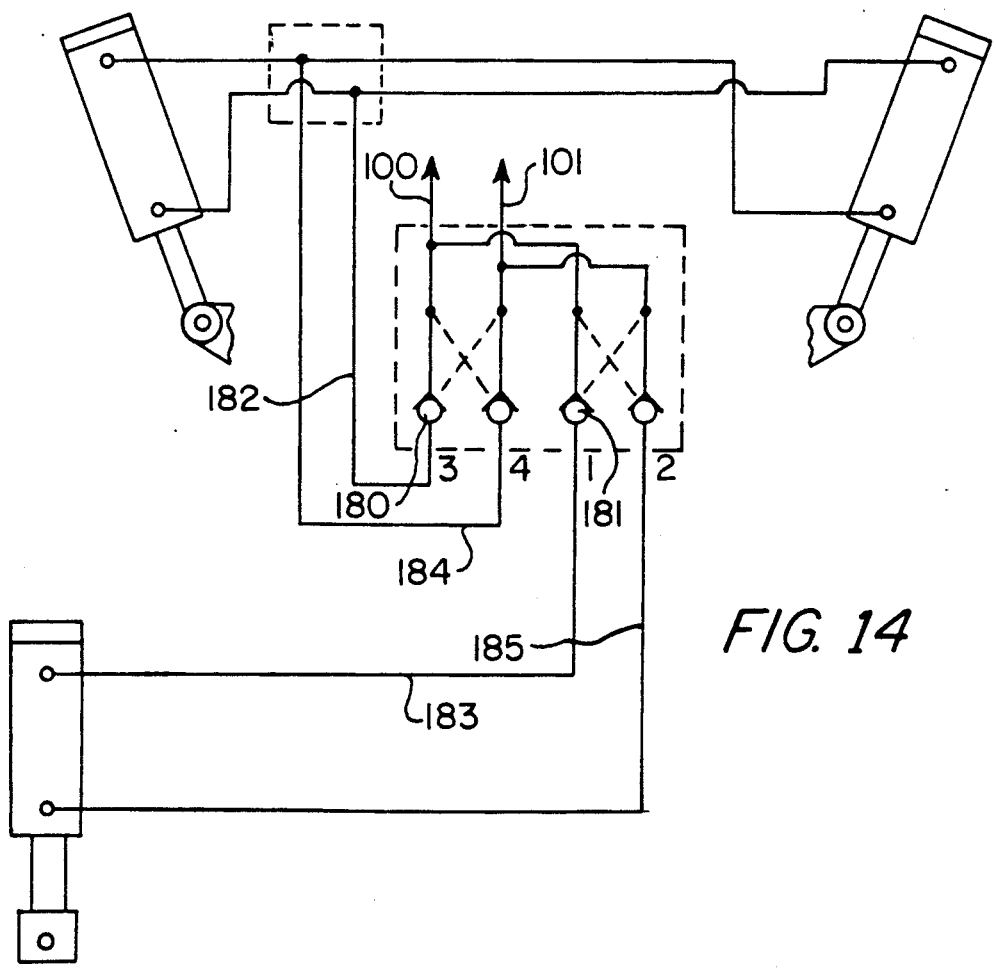
FIG. 14 is a schematic of hydraulic connections to the positioning cylinders and tilt cylinder of the modification.

In order to control the operation of the positioning cylinders and the single tilt cylinder of the modification a hydraulic hookup as indicated on FIG. 14 is provided. The hookup includes the lines 100-101 to the tractor disconnects. The line 100 is connected to joint 180 and joint 181 which are connected to lines 182 and 183, respectively, to one side of the positioning cylinders and the tilt cylinder. The other line 101 is connected to line 184 and line 185 to the other side of the cylinders of the positioning cylinders and the tilt cylinder.

Ordinarily, activating the tractor hydraulics will unlock the circuit with the lesser pressure, usually the position cylinder circuit, permitting movement of the cylinders until the plow beam hits the stop on either the right or the left side. This will then permit the tilt cylinder to function. After all of the hydraulic functions have been completed the additional pressure bleeds over to the tractor relief. When the tractor lever is returned to neutral the double dual lock-out, as previously described, will lock all the cylinders preventing any movement during plowing.

I claim:

1. A reversible moldboard plow, comprising a generally planar frame having front and rear cross members, first and second lower hitch means carried by the front cross member, a longitudinal beam, means pivotally mounting said beam approximately centrally of said rear cross member for swinging movement in substantially the plane of the frame, moldboards mounted transversely of said beam in longitudinal spaced relation and depending beneath it for plowing the ground, and first and second hydraulic cylinder and piston means mounted on said rear cross member on opposite sides of said longitudinal beam and substantially in the plane thereof, said cylinder and piston means mounted for swinging movement in spaced relation from said beam, each of said cylinder and piston means pivotally connected to said beam forwardly of said rear cross member, means for extending one of the cylinder and piston means simultaneously with the retraction of the other, whereby operation of the cylinder and piston means causes the beam to swing from side to side in order to change the angle of said moldboards with respect to the direction of travel, and first and second spaced bracket means depending from said front cross member, first and second cylinder and piston means mounted on said first and second bracket means, said first and second lower hitch means carried by said first and second cylinder and piston means, whereby operation of said first and second cylinder and piston means controls the angle of tilt of aid frame.

2. The invention of claim 1, in which the cylinder and piston means for the first and second hydraulic cylinders and for the first and second lower hitch means are connected and parallel to common lines for connection to the hydraulic lines of a tractor, whereby application of pressure through said parallel lines will result in operation of either the first and second hydraulic cylinders or the first and second lower hitch means until the one operated has reached the extent of its travel after which the other will be operated following which the lines may be closed to prevent any movement of the first and second hydraulic cylinder and piston means or the first and second lower hitch means.

3. The invention of claim 1, said bracket means having means for guiding said first and second lower hitch means as they are raised and lowered.

4. The invention of claim 3, and replaceable wear plate means mounted on said bracket means for engaging said lower hitch means as it is raised and lowered.

5. The invention of claim 1, said front cross member having plate means engaging and supporting the forward end of said beam for swinging movement.

6. The invention of claim 1, and means supporting the rearward end portion of said beam in spaced relation above the ground.

7. A reversible moldboard plow, comprising a generally planar frame having front and rear cross members, first and second lower hitch means carried by the front cross member, a longitudinal beam, means pivotally mounting said beam approximately centrally of said rear cross member for swinging movement in substantially the plane of the frame, means supporting the rearward end portion of said beam in spaced relation above the ground, the front cross member having plate means engaging and supporting the forward end portion of said beam for such swinging movement, moldboards mounted transversely of said beam in longitudinal spaced relation and depending beneath it for plowing the ground, and first and second hydraulic cylinder and piston means mounted on said rear cross member on opposite sides of said longitudinal beam and substantially in the plane thereof, said cylinder and piston means mounted for swinging movement in spaced relation from said beam, each of said cylinder and piston means pivotally connected to said beam forwardly of said rear cross member, means for extending one of the cylinder and piston means simultaneously with the retraction of the other, whereby operation of the cylinder and piston means causes the beam to swing from side to side in order to change the angle of said moldboards with respect to the direction of travel, in which the first second lower hitch means are connected to a cylinder and piston means, said cylinder and piston means carried by the front cross member, and bracket means depending from said front cross member, said bracket means having means for guiding said first and second lower hitch means as they are raised and lowered, and replaceable wear plate means mounted on at least one of said bracket means for engaging said lower hitch means as it is raised and lowered.

8. A reversible moldboard plow, comprising a generally planar frame having front and rear cross members, first and second lower hitch means carried by the front cross member, a longitudinal beam, means pivotally mounting said beam approximately centrally of said rear cross member for swinging movement in substantially the plane of the frame, moldboards mounted transversely of said beam in longitudinal spaced relation and depending beneath it for plowing the ground, and hydraulic cylinder and piston means mounted on said rear cross member beside said longitudinal beam and substantially in the plane thereof, said cylinder and piston means mounted for swinging movement in spaced relation from said beam, said cylinder and piston means pivotally connected to said beam forwardly of said rear cross member, whereby operation of the cylinder and piston means causes the beam to swing from side to side in order to change the angle of said moldboards with respect to the direction of travel, and first and second spaced bracket means depending from said front cross member, first and second cylinder and piston means mounted on said first and second bracket means, said first and second lower hitch means carried by said first and second cylinder and piston means, whereby operation of said first and second cylinder and piston means controls the angle of tilt of said frame.

9. The invention of claim 8, said bracket means having means for guiding said first and second lower hitch means as they are raised and lowered.

10. The invention of claim 9, and replaceable wear plate means mounted on said bracket means for engaging said lower hitch means as it is raised and lowered.

11. The invention of claim 8, said front cross member having plate means engaging and supporting the forward end of said beam for swinging movement.

12. The invention of claim 8, and means supporting the rearward end portion of said beam in spaced relation above the ground.

* * * * *